United States Patent [19]
Weh et al.

[11] Patent Number: 6,099,044
[45] Date of Patent: Aug. 8, 2000

[54] CLAMPING DEVICE, IN PARTICULAR FOR A MALE COUPLING

[75] Inventors: Wolfgang Weh; Erwin Weh, both of Illertissen, Germany

[73] Assignee: Weh GmbH, Verbindungstechnik, Illertissen, Germany

[21] Appl. No.: 09/101,266

[22] PCT Filed: Dec. 30, 1996

[86] PCT No.: PCT/EP96/05865
§ 371 Date: Jun. 30, 1998
§ 102(e) Date: Jun. 30, 1998

[87] PCT Pub. No.: WO97/24547
PCT Pub. Date: Jul. 10, 1997

[30] Foreign Application Priority Data

Dec. 31, 1995 [DE] Germany .......................... 295 20 595

[51] Int. Cl.[7] .............................. F16L 37/18; F16L 35/00
[52] U.S. Cl. ................... 285/33; 285/312; 285/35
[58] Field of Search ..................... 285/311, 312, 285/322, 33, 34, 35

[56] References Cited

U.S. PATENT DOCUMENTS

| | | | |
|---|---|---|---|
| 1,784,822 | 12/1930 | Crowley | 285/312 |
| 4,154,465 | 5/1979 | Van Meter | 285/312 |
| 4,225,159 | 9/1980 | Van Meter | 285/104 |
| 4,326,407 | 4/1982 | Van Meter | 285/312 |
| 5,507,537 | 4/1996 | Meisinger et al. | 285/312 |
| 5,575,510 | 11/1996 | Weh et al. | 285/312 |
| 5,788,290 | 8/1998 | Meisinger | 285/35 |

FOREIGN PATENT DOCUMENTS

| | | | |
|---|---|---|---|
| 3518019 | 11/1986 | Germany | 285/312 |
| 3639528 | 11/1987 | Germany | 285/312 |
| 3929566 | 3/1991 | Germany | 285/34 |
| WO 89/07729 | 8/1989 | WIPO . | |
| WO 89/11059 | 11/1989 | WIPO . | |

Primary Examiner—Eric K. Nicholson
Attorney, Agent, or Firm—Knobbe, Martens, Olson & Bear, LLP

[57] ABSTRACT

The invention relates to a clamping device, in particular for a male coupling, with a substantially cylindrical housing, a clamping member mounted to be axially displaceable therein, and an actuation member which is arranged on the rear end of the housing, linked to the clamping member for axial displacement, pressurized by a compression spring and can be actuated by a hand lever. To increase the axial clamping force while operational force and production costs are kept low, it is provided that the actuation member has a holding bolt arranged centrally on the rear of the housing. A radially expanded stop flange for supporting the compression spring is provided on that end of the holding bolt which is inside the housing, and the hand lever is pivotably mounted on that end of the holding bolt which is outside the housing.

7 Claims, 2 Drawing Sheets

CLAMPING DEVICE, IN PARTICULAR FOR A MALE COUPLING

FIELD OF THE INVENTION

BACKGROUND OF THE INVENTION

This invention relates to a clamping device, especially for a plug-in coupling, with a substantially cylindrically shaped housing, a clamping element mounted to slide axially therein and an actuating part which is arranged on the rear side of the housing and is coupled to the clamping element for the axial displacement and is biased by a compression spring and can be actuated by means of a manual lever.

Such a clamping device for a plug-in coupling is known from DE 3 518 019 C2, wherein this plug-in coupling is especially in the form of a so-called test connector for pressure-tight connection to hydraulic lines, gas bottles and similar fluid lines. The actuation when connecting to the article carrying fluid, for example a connection nipple, pipe union or the like, is effected by a manual lever, which extends essentially axially to the cylindrically shaped housing. Single handed operation for coupling or uncoupling the plug-in coupling, with simultaneous actuation of the clamping device can thus be effected through this manual lever, which is preferably adapted to the human hand. The pivotally articulated manual lever at the rear end of the coupling housing presses against the rear end of a clamping piston, serving as the clamping element, via a pin, the piston having radially spreading clamping grippers or clamping jaws at its front end, which engage behind the corresponding profiling of the connector, (e.g. connection nipple) in the clamping position. This clamping piston is furthermore biased by a compression spring, which holds the clamping grippers spread when the manual lever is released, so that the plug-in coupling is hereby biased into and held in its engaged position.

The spring force of this compression spring should be as high as possible, in order to hold the clamping element or clamping jaws in the engaged position of the plug-in coupling with as high a force as possible. However, this involves a relatively high actuating force over the path of actuation (axial stroke) of some centimetres, so that a compromise is mostly made between biasing spring force and the actuating force to be applied to the manual lever. In particular an increase in the spring force of the compression spring is generally ruled out, since the actuation of the compression spring shown in this reference can lead to canting of the pressure spring through a pin engaging at the side. In addition the lever ratios in this plug-in coupling are restricted by the lateral arrangement, so that the maximum actuating forces is also limited.

Actuation of the basically similarly constructed plug-in coupling is known from WO 89/07729 by a rear end pressure knob of about the size of the palm of a hand, with which a compression spring can be actuated to connect up or release the plug-in coupling. However, the operating forces which can be applied are small. A likewise similarly constructed plug-in coupling is furthermore known from WO 89/11059, wherein the actuation of the clamping piston serving as the clamping element is effected via an eccentric. Although the lever ratios are more favourable here, the manufacture of this eccentric is very expensive. In addition it is a disadvantage with all these clamping devices that the bias force in the clamping position (clamping jaws locked) is lowered on account of the relatively large axial stroke required for actuation, while the spring force to be overcome is at its highest on actuating the clamping device, since the compression spring has to be compressed more or less completely or even until it is solid.

The invention is accordingly based on the object of improving a clamping device of the kind defined in respect of the axial clamping force acting on the clamping element with a smaller actuating force and smaller manufacturing cost.

SUMMARY OF THE INVENTION

This object is met by a clamping device having a substantially cylindrically shaped housing having a rear side, a clamping element mounted to slide axially in the housing, and an actuating part. The actuating part is arranged on the rear side of the housing, coupled to the clamping element for the axial displacement and biased by a compression spring. The actuating part is configured to be actuated by a manual lever, and comprises a central pull rod arranged on the rear side of the housing. The pull rod is configured to comprise a radially enlarged abutment flange for abutment of the compression spring which is provided on an end of the pull rod inside the housing, and to receive the manual lever which is pivotally mounted to the end of the pull rod outside the housing.

Through the formation of the actuating part with a centrally arranged pull rod, a relatively strong compression spring can be used, which can act with higher clamping force on the clamping element, namely the clamping piston and the clamping jaws therewith in the preferred application in a plug-in coupling, and can hold it in its engaged position. Through the central arrangement of the pull rod the action of the compression spring is extremely uniform, so that no canting occurs. A simple manufacture results from the radially enlarged abutment flange on the end of the pull rod inside the housing, while in preferred manner the abutment flange for the compression spring can serve at the same time for exact guidance of the pull rod within a sleeve. A reduction in the operating force also arises from this, especially avoidance of canting, so that "breakaway forces" are avoided. A particularly simply manufactured mounting arises from the pivotal mounting of the manual lever no longer on the housing but rather on the end of the pull rod outside the housing. The lever length of the manual lever can be made arbitrarily great, so that particularly high forces can be applied against the compression spring.

It is essential in particular that, in contrast to the state of the art, the spring path of the compression spring into the clamping position is very small, in spite of a relatively large axial stroke of the tensioning element, so that the spring force does not drop off in the clamping position but is at the maximum or remains high. The operating force when unloading the clamping device (e.g. when attaching the plug-in coupling) is on the other hand minimal, since in comparison with the known plug-in couplings the compression spring needs to be compressed no longer or only hardly at all in the axial displacement of the clamping element.

The manual lever is in preferred manner in the form of a locking device operating over dead centre, especially through two abutment surfaces running at an angle of about 80° to one another in the region of the pivotal mounting, so that reliable retention of the manual lever in both end positions is attained. In addition the manual lever can be so formed that an opposite position can be assumed, as well as the two extreme positions, so that the manual lever can be swung up or down (or to the right or the left), depending on the application. In addition, the arrangement of the central pull rod has rotational symmetry, so that the manual lever can be brought into an arbitrary rotational position relative to the central axis of the clamping device, which can be advantageous especially under confined mounting conditions.

Further advantageous arrangements are the subject matter of the dependent claims.

Two preferred embodiments of the clamping device for the example of use of a plug-in coupling will be described and explained in more detail with reference to the drawings, in which:

DETAILED DESCRIPTION OF THE INVENTION

Figure 1:
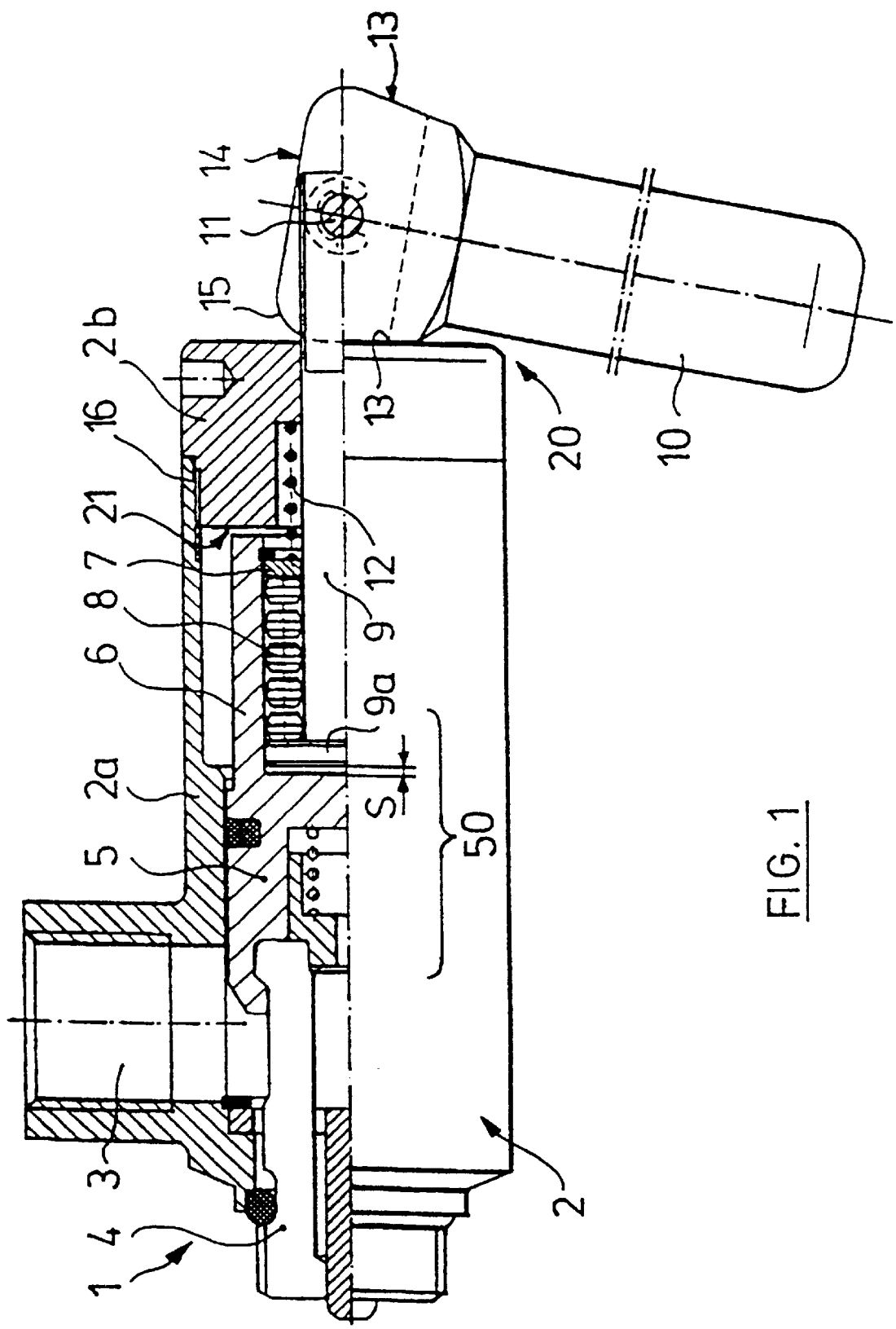
FIG. 1 shows a first embodiment of a clamping device in a plug-in coupling in side view, half sectioned along the central axis.
Figure 2:
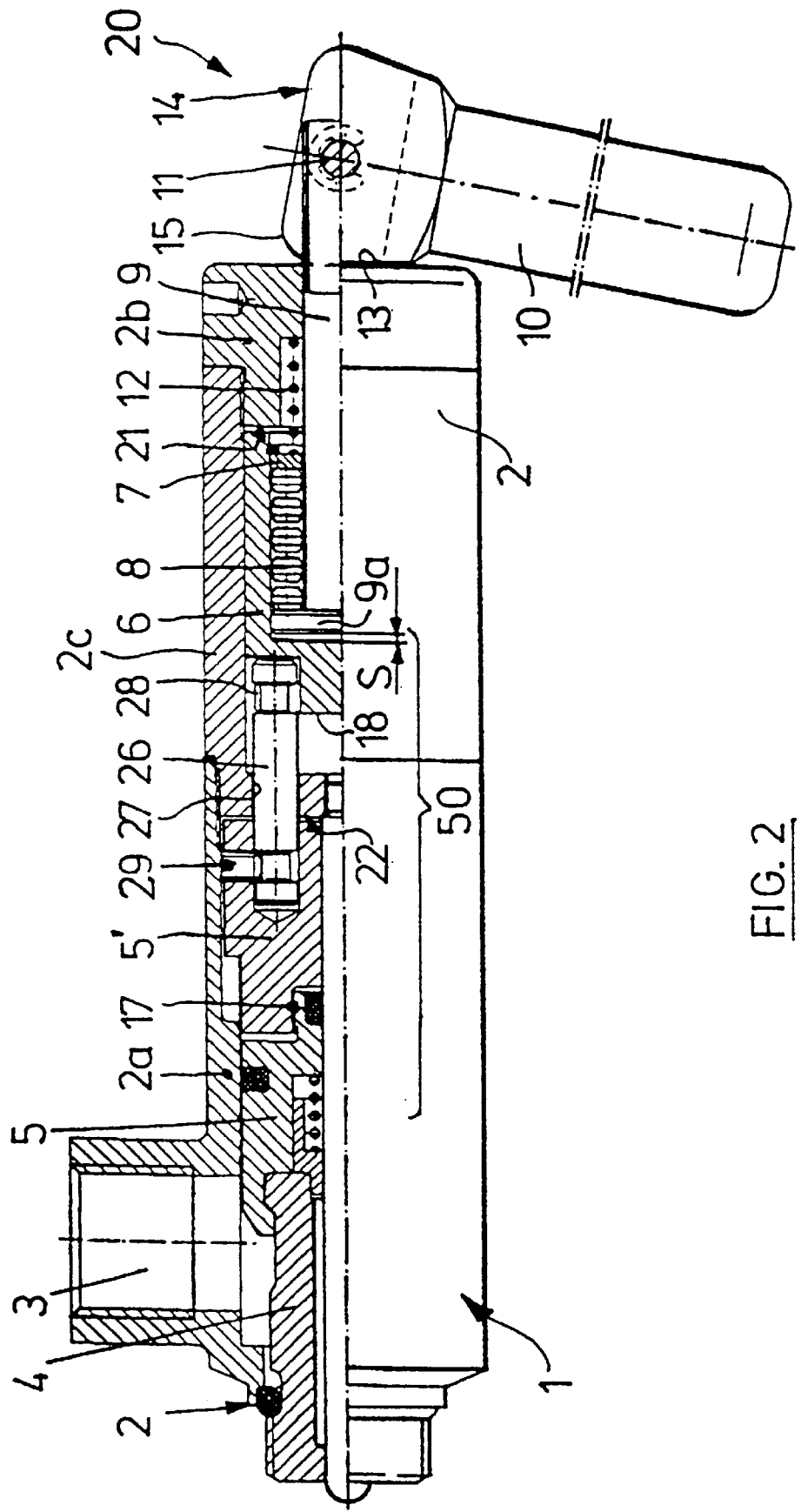
FIG. 2 shows a second embodiment of the clamping device in a plug-in coupling in side view half sectioned along the central axis.

A first embodiment of a plug-in coupling 1 with an integrated clamping device is shown in FIG. 1 and is formed essentially of a cylindrically shaped housing 2 and clamping jaws 4 movable axially therein with a clamping piston 5 likewise mounted to slide axially as the clamping element 50. The clamping jaws 4 have a construction known per se and are arranged on the front end of the plug-in coupling (here facing left), distributed around the periphery of the clamping piston. For example there are six of these segment like clamping jaws 4, so that gas or a liquid can flow past in the intervening regions. The fluid is hereby fed through a side connector 3 into the housing 2. The clamping jaws 4 are attached at their free ends, here pointing to the left, to a complementary connector piece, not shown in detail here, e.g. a connecting nipple or a pipeline. The ends of the clamping jaws 4 here at the right are mounted in the axially slidable clamping piston 5, which is sealed relative to the housing 2, more precisely the front coupling housing part 2a. The clamping piston 5 comprises a tubular extension towards the right edge of the drawing, which is here denoted a sleeve 6 and is a component of the clamping element 50. The sleeve 6 is formed in one piece with the clamping piston 5 but can be arranged slidably in the housing 2 separately from the clamping piston 5, as is shown in FIG. 2.

A relatively strongly designed compression spring 8 is arranged in the interior of the sleeve 6, in the form of a helical spring or a stack of Belleville springs. The end of the compression spring 8 here to the right abuts against an axial stop ring 7, which is fixed in the sleeve 6 by a circlip. The end of the compression spring 8 here to the left bears against an abutment flange 9 of a centrally arranged pull rod 9. The abutment flange 9a also serves to guide the pull rod 9 in the sleeve 6 and also to limit the spring path of the compression spring 8, since the abutment flange 9a in the clamping position shown here is opposed to the inner end face of the sleeve 6 with a small clearance S.

The centrally arranged pull rod 9 is passed through a housing part 2b at the rear end of the housing 2. A manual lever 10 is mounted on the projecting end of the pull rod 9 by means of a pivot pin 11 and can have a very great length and is a component of an actuating part 20 for the clamping element 50. The manual lever 10 is forked in the region of the pivot pin 11 so that a stable, two-sided mounting is obtained. Two eccentrically disposed abutment surfaces 13 and 14 are formed on the manual lever 10 in the region of the pivot pin 11. The abutment surface 13 bears on the rear end face of the housing 2 in the clamping position shown here and is spaced by the actuating stroke of the clamping element 50 from the pivot pin 11, while the abutment surface 14 lying closer to the pivot bear thereon in the released position. The abutment surfaces 13 and 14 are formed at an angle of about 80° to one another, so that retention or "over dead-centre" locking of the manual lever 10 takes place in both positions. In the clamping position of the manual lever 10 shown here the clamping jaws 4 are spread and are located in the engaged position. When releasing by turning or swinging the manual lever 10 through about 100° the second abutment surface 14, which is aligned perpendicular to the central axis of the manual lever 10, comes into abutment with the rear end face of the housing 2.

In this extended position of the manual lever 10 in continuation of the essentially cylindrical housing 2, the pull rod 9 can move here to the left, whereby the abutment flange 9a comes into engagement with the inner end face of the sleeve 6 or of the clamping piston 5 of the clamping element 50, with elimination of the gap S, in that the clamping element 50 is subject to the additional influence of an auxiliary compression spring 12, which is opposed to the main compression spring 8 it can slide as a block or unit into the non-clamping position, here to the left.

The auxiliary compression spring 12 is mounted in the rear housing part 2b, which is connected to the front housing part by a connecting thread 16. The rear end face of the housing part 2b facing the manual lever 10 is preferably hardened, nitrided or heat treated, in order to prevent the occurrence of wear from the actuation of the manual lever 10, especially when passing over the rounded region 15 between the two abutment faces 13 and 14. However it should be noted that a roller can be provided in the transition region 15 between the abutment surface 13 and 14 on each of the two fork parts of the manual lever 10 for the reduction of friction, so that free turning can be achieved.

A second embodiment of the clamping device in a plug-in coupling 1 is shown in FIG. 2 in a half sectioned side view along the central axis. The functionally equivalent components are given the same reference numerals as in FIG. 1. An essential distinguishing feature compared with the first embodiment is the provision of a relatively short clamping piston 5, which is connected to an intermediate piston 5' by a screw connection 17. Furthermore a middle coupling housing part 2c is introduced between the front housing part 2a and the rear housing part 2b. The compression spring 8 is surrounded by a sleeve 6 separate from the clamping piston 5. Furthermore a pull pin 26 is hooked into the front 18 of the sleeve 6 and runs through a guide bore 27 in the middle housing part 2c to a correspondingly formed complementary receiver in the intermediate piston 5'. The pull pin 26 is fixed fast in relation to tension relative to the central axis of the plug-in coupling 1 by suitable recesses 28 in the sleeve 6 and is secured in the intermediate piston 5' by means of a cross screw 29.

The function of the clamping device, especially of the operating or actuating part 20 with the manual lever 10, the pull rod 9 and the compression spring 8 for biasing the clamping element 50 with the clamping piston 5—clamping jaws 4—arrangement is essentially the same as in the embodiment according to FIG. 1. In the engaged position of the clamping jaws 4 shown in both FIG. 1 and FIG. 2, these are biased by means of the compression spring 8 towards the right end by the clamping piston 5, optionally via the intermediate piston 5' and the pull pin 26 and via the sleeve 6, so that the clamping jaws 4 are fixed with a high clamping force in their engaged position. In this clamping position of the clamping element 50 the abutment flange 9a of the pull rod 9 is spaced by the clearance S from the inner end face of the sleeve 6 and forms the left hand end abutment for the compression spring 8. This can thus urge the sleeve 6 and components of the clamping element 50 attached thereto to the right with a high clamping force, until the sleeve 6 has its right end face bearing against a stop 21 and/or against the abutment flange 9a and/or on a correspondingly acting abutment 22 for the intermediate piston 5' in the region of the pull pin 26. The effective spring stroke of the compression spring 8 is thus very small, namely in correspondence with the clearance S merely in the millimetre range, so that a reduction in the spring bias force of the compression spring 8 on account of too large a spring stroke is not to be feared, in spite of a large axial stroke.

On account of the arrangement of the manual lever 10 with the central pull rod 9 easy operation results, since the pull rod 9 together with the abutment flange 9a rules out canting of the compression spring 8 and in addition the lever length of the manual lever 10 can be selected arbitrarily large. The operating force of the clamping device is thus very small with a high clamping force on the clamping element 50 and the components attached thereto, such as here the clamping jaws 4, since when actuating the clamping device only the spring force of the relatively weak auxiliary spring 12 has to be overcome over the major part of the actuating stroke with axial displacement of the clamping element 50. On the other hand however, at the end of the actuating stroke into the clamping position shown here, therefore in the transition from the abutment surface 14 to the abutment surface 13, the compression spring 8 is biased with creation of the gap S and is thus activated, so that this then can act on the whole clamping element 50 with a high clamping force.

Accordingly for one thing a high connection reliability of the plug-in coupling 1 results and for another a particularly simple, force-saving operability of the clamping device during coupling and un-coupling of the plug-in coupling 1. As already indicated, this clamping device is not only suitable for plug-in couplings but also for other connecting and mounting devices. The component half here shown in the left in each case can be exchanged rapidly, for example by releasing the threaded connections 16, 17 and 19, so that different kinds of clamping jaws or grippers can be attached to the clamping element 50 and the actuating part 20. The pull pin 26 is also especially adapted for permitting a particularly rapid coupling of the clamping device to various connector or attachment modules.

What is claimed is:

1. A clamping device, especially for a plug-in coupling, comprising:
    a substantially cylindrically shaped housing, the housing having a rear side;
    a clamping element mounted to slide axially in the housing;
    an actuating part, the actuating part is arranged on the rear side of the housing, coupled to the clamping element for the axial displacement and biased by a compression spring, the actuating part being configured to be actuated by a manual lever, and comprising a central pull rod arranged on the rear side of the housing, the pull rod being configured to comprise a radially enlarged abutment flange for abutment of the compression spring which is provided on an end of the pull rod inside the housing, and to receive the manual lever which is pivotally mounted to the end of the pull rod outside the housing; and
    an auxiliary compression spring configured to act in a sense which is opposite to a sense of the compression spring.

2. The clamping device according to claim 1, wherein the compression spring and the auxiliary compression spring abut a common stop ring on the clamping element.

3. The clamping device according to claim 2, wherein the clamping element comprises a clamping piston with a sleeve of the clamping element formed thereon in an axial direction.

4. A clamping device, especially for a plug-in coupling, comprising:
    a substantially cylindrically shaped housing, the housing having a rear side;
    a clamping element mounted to slide axially in the housing;
    an actuating part, the actuating part being arranged on the rear side of the housing, coupled to the clamping element for the axial displacement and biased by a compression spring, the actuating part being configured to be actuated by a manual lever, and comprising a central pull rod arranged on the rear side of the housing, the pull rod being configured to comprise a radially enlarged abutment flange for abutment of the compression spring which is provided on an end of the pull rod inside the housing, and to receive the manual lever which is pivotally mounted to the end of the pull rod outside the housing, the compression spring and the pull rod being fitted in a sleeve of the clamping element; and
    at least one pull pin for releasable connection to one of a clamping piston and an intermediate piston, the at least one pull pin being arranged on a front portion of the sleeve.

5. The clamping device according to claim 4, wherein the pull pin is guided in a bore of a middle coupling housing part.

6. The clamping device according to claim 5, wherein the housing is divided in the region of the pull pin.

7. The clamping device according to claim 5, wherein the coupling housing part can be screwed into the housing.

* * * * *